United States Patent
Jia et al.

(10) Patent No.: US 11,895,577 B2
(45) Date of Patent: Feb. 6, 2024

(54) NETWORK SLICE SELECTION METHOD AND APPARATUS

(71) Applicant: HUAWEI TECHNOLOGIES CO., LTD., Shenzhen (CN)

(72) Inventors: Xiaoqian Jia, Shanghai (CN); Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 17/198,993

(22) Filed: Mar. 11, 2021

(65) Prior Publication Data

US 2021/0219222 A1    Jul. 15, 2021

Related U.S. Application Data

(63) Continuation of application No. PCT/CN2019/105479, filed on Sep. 11, 2019.

(30) Foreign Application Priority Data

Sep. 12, 2018 (CN) .......................... 201811061061.3

(51) Int. Cl.
    *H04W 48/18* (2009.01)
    *H04W 48/02* (2009.01)
    *H04W 48/16* (2009.01)

(52) U.S. Cl.
    CPC ........... *H04W 48/18* (2013.01); *H04W 48/02* (2013.01); *H04W 48/16* (2013.01)

(58) Field of Classification Search
    CPC ..... H04W 48/18; H04W 48/02; H04W 48/16; H04W 16/02; H04W 24/02;
    (Continued)

(56) References Cited

U.S. PATENT DOCUMENTS

2017/0070892 A1*  3/2017  Song ..................... H04L 41/042
2019/0037409 A1*  1/2019  Wang ..................... H04W 8/08
(Continued)

FOREIGN PATENT DOCUMENTS

CN    105813195 A    7/2016
CN    106572516 A    4/2017
(Continued)

OTHER PUBLICATIONS

V15.1.0 (Jan. 2018), Release 15; Study on management and orchestration of network slicing for next generation network (Year: 2018).*
(Continued)

*Primary Examiner* — Mohammed S Chowdhury
(74) *Attorney, Agent, or Firm* — HAUPTMAN HAM, LLP (57) ABSTRACT

A network slice selection method and apparatus are provided, to ensure performance of a high-priority service. The method includes: A first management unit obtains a service request message, where the service request message is used to initiate a service request for a service of a tenant; and the first management unit sends a network slice request message to a second management unit based on the service request message, where the network slice request message carries priority information, the priority information is used to indicate a priority of the tenant or a priority of the service, and the priority information is used by the second management unit to select a network slice for the service of the tenant.

17 Claims, 5 Drawing Sheets

(58) Field of Classification Search
CPC . H04L 41/0894; H04L 41/0895; H04L 41/40; H04L 47/2433; H04L 43/0852; H04L 43/0888; H04L 41/5054; H04L 41/0806; H04L 41/0893; H04L 47/24
See application file for complete search history.

(56) References Cited

U.S. PATENT DOCUMENTS

| | | | | |
|---|---|---|---|---|
| 2020/0112861 | A1* | 4/2020 | Yao | H04L 41/0894 |
| 2021/0243067 | A1* | 8/2021 | Ping | H04L 41/0895 |

FOREIGN PATENT DOCUMENTS

| | | |
|---|---|---|
| CN | 107295609 A | 10/2017 |
| CN | 107580360 A | 1/2018 |
| CN | 107708109 A | 2/2018 |
| EP | 3439277 A1 | 2/2019 |
| EP | 3648401 A1 | 5/2020 |
| WO | 2018058579 A1 | 4/2018 |
| WO | 2018093168 A1 | 5/2018 |
| WO | 2018141945 A1 | 8/2018 |

OTHER PUBLICATIONS

RAN WG3 Meeting #93; R3-161759; Source: Huawei (Same assignee but published more than a year of the instant application); Title: RAN Support for Core Network Slicing; Gothenburg, Sweden, Aug. 22-26, 2016 (Year: 2016).*

"3rd Generation Partnership Project; Technical Specification Group Services and System Aspects; Telecommunication management; Study on management and orchestration of network slicing for next generation network (Release 15)", 3GPP TR 28.801, V15.1.0, Jan. 4, 2018, XP051392292.total 75 pages.

"3rd Generation Partnership Project; Technical Specification Group Services and System Aspects; Management and orchestration; Provisioning; (Release 15)", 3GPP TS 28.531, V1.3.0, Sep. 10, 2018, XP051486956. total 61 pages.

Extended European Search Report issued in corresponding European Application No. 19859364.2, dated Oct. 20, 2021, pp. 1-12, European Patent Office, Munich, Germany.

Pang, Xiaodan et al., Slice scheduling strategy in LTE wireless network virtualization. Telecommunications Science, 2017, 7 pages.

Chinese Office Action issued in corresponding Chinese Application No. 201811061061.3, dated Oct. 10, 2020, pp. 1-9.

International Search Report issued in corresponding International Application No. PCT/CN2019/105479, dated Nov. 27, 2019, pp. 1-12.

* cited by examiner

NETWORK SLICE SELECTION METHOD AND APPARATUS

CROSS-REFERENCE TO RELATED APPLICATIONS

This application is a continuation of International Application No. PCT/CN2019/105479, filed on Sep. 11, 2019, which claims priority to Chinese Patent Application No. 201811061061.3, filed on Sep. 12, 2018. The disclosures of the aforementioned applications are hereby incorporated by reference in their entireties.

TECHNICAL FIELD

Embodiments of this application relate to the field of communications technologies, and in particular, to a network slice selection method and apparatus.

BACKGROUND

A 5th generation (the 5th-generation, 5G) mobile communications system uses a network slicing technology. A network slice is a combination of hardware, software, a policy, and a spectrum that are dynamically deployed by a network operator from a service perspective to satisfy a quality of service of a specific user set. The network slice provides an end-to-end network service from a radio access network to a core network for a terminal. Specifically, in a network that supports the slicing technology, a network function is divided into a plurality of virtual network function (virtual network function, VNF) modules. The VNF modules may be configured to perform different network functions such as sorting, segmentation, encryption, and decryption. The VNF modules are dynamically deployed in the network, to form network slices. Each network slice includes a group of function instances. The network slices can provide services for various types of services. From a perspective of network security, different tenants or different services have different security requirements. Application of a network slice enables an operator or a user to flexibly deploy a network service in different application scenarios, thereby improving utilization efficiency of physical network resources. In addition, security of the network slice is ensured based on independent configuration and management of the network slice.

In actual application, one network slice may carry a plurality of tenants, and the plurality of tenants share a resource of the network slice. When a service of a tenant among the plurality of tenants changes, a resource occupied by the tenant also changes. In this way, a resource occupied by another tenant among the plurality of tenants is affected. If an affected tenant has a high requirement on a network, communication quality of a service of the tenant is significantly affected.

SUMMARY

Embodiments of this application provide a network slice selection method and apparatus, to resolve a problem of a network slice resource conflict that occurs when a plurality of tenants or a plurality of services share a network slice, to ensure performance of a high-priority service.

A specific technical solution provided in the embodiments of this application is as follows.

According to a first aspect, a network slice selection method is provided. The solution is executed by a first management unit. For example, the first management unit may be a communication service management function CSMF. Specific steps of the method are as follows: The first management unit obtains a service request message, where the service request message is used to initiate a service request for a service of a tenant; and the first management unit sends a network slice request message to a second management unit based on the service request message, where the network slice request message carries priority information, the priority information is used to indicate a priority of the tenant or a priority of the service, and the priority information is used by the second management unit to select a network slice for the service of the tenant. Optionally, the second management unit may be a network slice management function NSMF. According to the network slice selection method, in a scenario in which a plurality of tenants share one network slice, an adaptive network slice may be allocated to a relatively high-priority service based on the priority of the tenant or the priority of the service, to preferentially ensure performance of a high-priority service. This ensures that allocation of resources of a plurality of tenants in one network slice is proper and effective.

In a possible design, the first management unit determines the priority information based on the service request message.

In a possible design, the service request message includes at least one of the following information: identification information of the tenant, identification information of the service, and service requirement information of the service, and the service requirement information includes at least one of the following information: a service type, a security level, an isolation level, a throughput, coverage, and a quality of service requirement; and the first management unit may determine the priority information based on the at least one piece of information in the service request message. According to this design, a specific manner in which the first management unit determines the priority information is provided.

In a possible design, the priority information may be alternatively determined in the following manners: The first management unit determines a network requirement of the service based on service requirement information of the service, and the first management unit determines the priority information based on the network requirement of the service, where the service requirement information includes at least one of the following information: a service type, a security level, an isolation level, a throughput, coverage, and a quality of service requirement, and network requirement information includes at least one of the following information: a latency requirement, a bandwidth requirement, and a network quality of service requirement. According to this design, another specific manner in which the first management unit determines the priority information is provided.

In a possible design, that the first management unit obtains a service request message specifically includes: The first management unit may receive the service request message from a communication service provider, or send the service request message by a user. If the service request message is received from the communication service provider, the service request message may carry the priority information, and the first management unit obtains the priority information from the service request message. According to this design, a specific manner in which the first management unit obtains the priority information is provided.

According to a second aspect, a network slice selection method is provided. The solution is executed by a second management unit. For example, the second management unit may be a network slice management function NSMF. Specific steps of the method are as follows: The second management unit receives a network slice request message from a first management unit, where the network slice request message carries first priority information, and the first priority information is used to indicate a priority of a tenant or a priority of a service of a tenant; and the second management unit selects a network slice for the service of the tenant based on the first priority information. In this way, in a scenario in which a plurality of tenants share one network slice, an adaptive network slice may be allocated to a relatively high-priority service based on the priority of the tenant or the priority of the service, to preferentially ensure performance of a high-priority service. This ensures that allocation of resources of a plurality of tenants in one network slice is proper and effective.

In a possible design, that the second management unit selects a network slice for the service of the tenant based on the first priority information specifically includes: The second management unit determines second priority information that matches the first priority information, where the second priority information is used to indicate a priority of the network slice; and the second management unit selects the network slice having the second priority information for the service of the tenant. In this way, a matched network slice may be selected for the service of the tenant to ensure service performance.

In a possible design, the second management unit creates the network slice, and configures the second priority information for the network slice based on first slice performance information of the network slice; or if the network slice is a network slice that has been created, the second management unit obtains second slice performance information of the network slice, and dynamically updates priority information of the network slice based on the second slice performance information, where the updated priority information is the second priority information.

In a possible design, both the first slice performance information and the second slice performance information include at least one of the following information: a latency requirement, a bandwidth requirement, and a network quality of service requirement.

According to a third aspect, a method for determining a priority of a network slice is provided. The method is executed by a management unit, and the management unit may be denoted as a second management unit, for example, may be a network slice management function NSMF. A specific method is as follows: The management unit creates a first network slice instance NSI, and configures priority information for the first NSI based on first slice performance information of the first NSI; or the management unit obtains second slice performance information of a second NSI, and updates the priority information for the first NSI based on the second slice performance information, where the second NSI is an NSI that has been created. In this way, a network slice that matches a priority may be accurately allocated to a service by creating and maintaining priority information of the network slice, to ensure service performance.

In a possible design, both the first slice performance information and the second slice performance information include at least one of the following information: a latency requirement, a bandwidth requirement, and a network quality of service requirement.

According to a fourth aspect, a network slice selection apparatus is provided. The apparatus has a function of implementing a behavior of the first management unit in any one of the first aspect or the possible designs of the first aspect, and includes a corresponding means (means) configured to perform the steps or functions described in the foregoing methods. The steps or functions may be implemented by using software, hardware (for example, a circuit), or a combination of hardware and software.

In a possible design, the apparatus includes one or more processors and a communications unit. The one or more processors are configured to support the network slice selection apparatus in performing a corresponding function of the first management unit in the foregoing methods, for example, obtaining a service request message, and sending a network slice request message to a second management unit based on the service request message. The communications unit is configured to support the network slice selection apparatus in communicating with another device, to implement a receiving function and/or a sending function, for example, sending the network slice request message to the second management unit.

Optionally, the apparatus may further include one or more memories. The memory is configured to couple to the processor, and the memory stores program instructions and/or data that are/is necessary for the apparatus. The one or more memories may be integrated with the processor, or may be disposed independent of the processor. This is not limited in this application.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the network slice selection apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the first management unit in any one of the first aspect or the possible designs of the first aspect.

Optionally, the network slice selection apparatus may be a communication service management function CSMF.

According to a fifth aspect, a network slice selection apparatus is provided. The apparatus has a function of implementing a behavior of the second management unit in any one of the second aspect, the third aspect, the possible designs of the second aspect, or the possible designs of the third aspect, and includes a corresponding means (means) configured to perform the steps or functions described in the foregoing methods. The steps or functions may be implemented by using software, hardware (for example, a circuit), or a combination of hardware and software.

In a possible design, the apparatus includes one or more processors and a communications unit. The one or more processors are configured to support the network slice selection apparatus in performing a corresponding function of the second management unit in the foregoing methods, for example, selecting a network slice for a service of a tenant based on first priority information. The communications unit is configured to support the network slice selection apparatus in communicating with another device, to implement a receiving function and/or a sending function, for example, receiving a network slice request message from a first management unit.

Optionally, the apparatus may further include one or more memories. The memory is configured to couple to the processor, and the memory stores program instructions and/or data that are/is necessary for the apparatus. The one or more memories may be integrated with the processor, or may be disposed independent of the processor. This is not limited in this application.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the network slice selection apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the second management unit in any one of the second aspect, the third aspect, the possible designs of the second aspect, or the possible designs of the third aspect.

Optionally, the network slice selection apparatus may be a network slice management function NSMF.

According to a sixth aspect, a system is provided. The system includes the network slice selection apparatuses provided in the fourth aspect and the fifth aspect.

According to a seventh aspect, a computer-readable storage medium is provided, configured to store a computer program. The computer program includes instructions for performing the method according to the first aspect, the second aspect, the possible designs of the first aspect, or the possible designs of the second aspect.

According to an eighth aspect, a computer program product is provided. The computer program product includes computer program code, and when the computer program code is run on a computer, the computer is enabled to perform the method according to any one of the first aspect, the second aspect, the possible designs of the first aspect, or the possible designs of the second aspect.

DESCRIPTION OF EMBODIMENTS

Embodiments of this application provide a network slice selection method and apparatus, to ensure performance of a high-priority tenant or a high-priority service. The method and the apparatus are based on a same inventive concept. The method and the apparatus have similar problem-resolving principles. Therefore, implementations of the apparatus and the method may mutually refer to each other, and no repeated description is provided. In descriptions of the embodiments of this application, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In this application, at least one means one or more, and a plurality of means two or more. In addition, it should be understood that, in the descriptions of this application, terms such as "first" and "second" are merely used for differentiation and description, but cannot be understood as an indication or implication of relative importance or an indication or implication of a sequence.

The following describes in detail the embodiments of this application with reference to the accompanying drawings.

The network slice selection method provided in the embodiments of this application may be applicable to communications systems by using different radio access technologies, for example, a long term evolution (long term evolution, LTE) system, a 5th generation (5th generation, 5G) communications system, or more possible communications systems.

Figure 1:
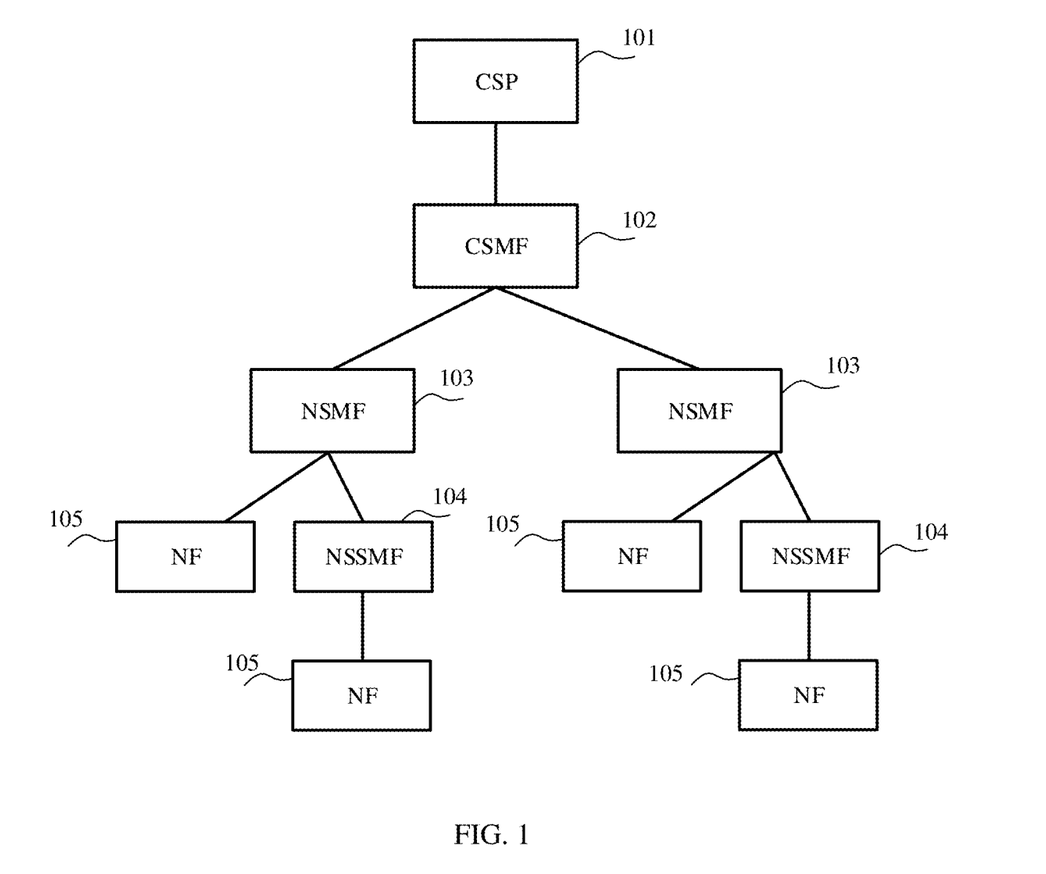
FIG. 1 is a schematic diagram of a system architecture according to an embodiment of this application.

FIG. 1 is a schematic diagram of an example of a system architecture to which an embodiment of this application is applicable. This embodiment of this application is not limited to the system architecture shown in FIG. 1. As shown in FIG. 1, the system architecture provided in this embodiment of this application may include at least one of the following logical function nodes: a communication service provider (communication service provider, CSP) 101, a communication service management function (communication service management function, CSMF) 102, a network slice management function (network slicing management function, NSMF) 103, a network slice subnet management function (network slicing subnet management function, NSSMF) 104, and a network function (network function, NF) 105. The CSP is configured to deliver service information of a tenant to the CSMF. The CSMF is configured to: receive the service information of the tenant delivered by the CSP, perform service management, and convert a service requirement into a network requirement. The NSMF is configured to manage a network slice and provide a slice service. The NSSMF is configured to manage a network slice subnet and provide a network slice subnet service. The NF is configured to manage a network function and provide a network function service, and the NF may be connected to the NSSMF or the NSMF. All logical function nodes shown in FIG. 1 may be hardware, or may be software obtained through functional division, or a structure obtained by combining the hardware and the software. The logical function nodes may be integrated into one network element, or may be distributed in different network elements. The logical function node may also be referred to as a functional module.

The system architecture shown in FIG. 1 is an example of an architecture to which the embodiments of this application may be applicable. The method provided in the embodiments of this application may be further applied to another system architecture. A person skilled in the art may change names of the logical function nodes in the system architecture shown in FIG. 1 to other names. When a same function is performed, this falls within the protection scope of this application.

In descriptions of this application, a tenant may be a tenant of an operator network. For example, if an electric power company leases a network of an operator to deploy a smart metering service, it may be considered that the electric power company is one tenant of the operator. One tenant may have a plurality of users, and each user can initiate a service. For example, a smart metering apparatus of an electric power company may be considered as a user, and that the user requests to read a meter value is considered as one service. For another example, an automobile of an automobile company may be considered as one user, namely, a communication service in unmanned driving. For still another example, an ultra-high-definition video service with heavy traffic on a video website.

One or more network slice instances may be deployed for each network slice type. One network slice instance is one static network, and is referred to as a logical network customized based on different service requirements on a physical or virtual network infrastructure. A network slice may be a complete end-to-end network including a terminal device, an access network, a transport network, a core network, and an application server, can provide a complete communication service, and has a specific network capability. The network slice instance may alternatively be any combination of the terminal, the access network, the transport network, the core network, and the application server. In descriptions of the embodiments of this application, selecting a network slice for a tenant (or a service) may be selecting a network slice instance for the tenant (or the service).

Figure 2:
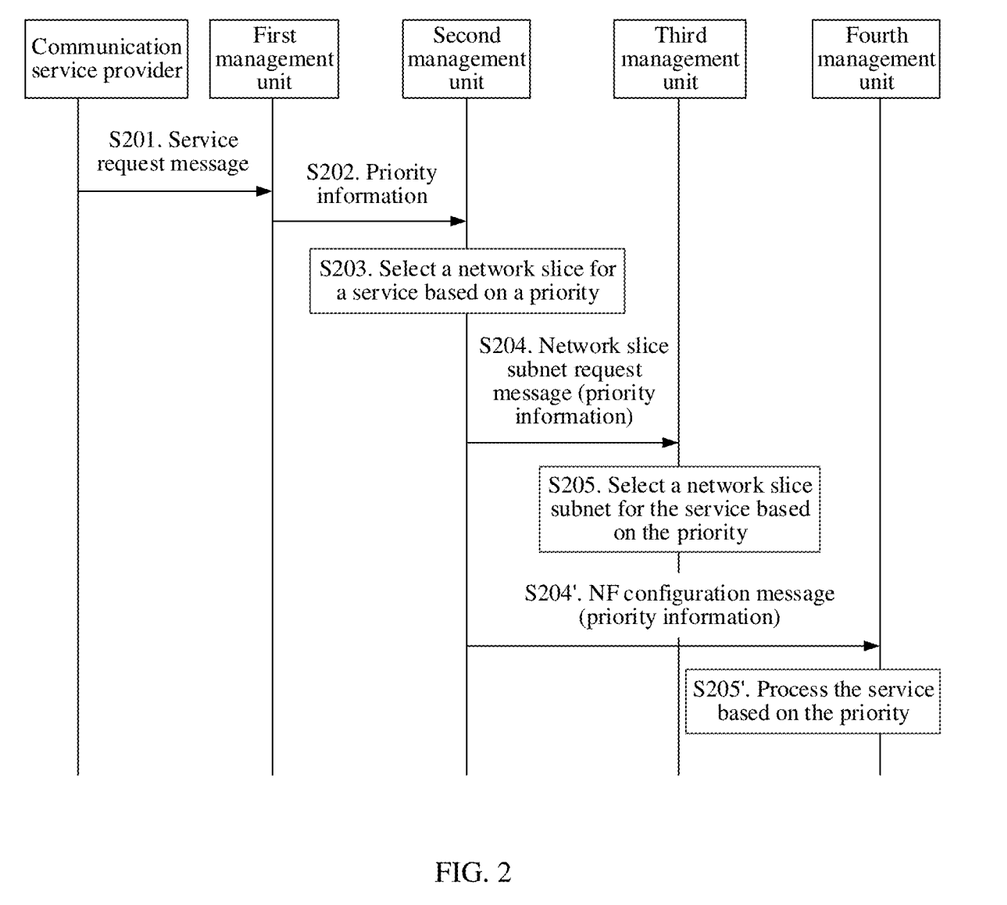
FIG. 2 is a first schematic flowchart of a network slice selection method according to an embodiment of this application.

Based on the system architecture shown in FIG. 1, as shown in FIG. 2, a procedure of a network slice selection method provided in this embodiment of this application is described as follows. In the following descriptions, a first management unit is a unit having a CSMF function. A communication service provider may also be referred to as a tenant service provider or an operator, and the communication service provider is a unit having a CSP function. A second management unit is a unit having an NSMF function, a third management unit is a unit having an NSSMF function, and a fourth management unit is a unit having an NF function.

S201. The first management unit obtains or receives a service request message.

Specifically, the service request message may be initiated by a user, or may be initiated by a communication service provider. For example, the communication service provider sends a service request message to the first management unit, and the first management unit receives the service request message from the communication service provider.

Specifically, when a user of a tenant has a service, the first management unit receives the service request message, and the service request message is used to initiate a service request of the tenant.

The service request message may carry service requirement information of the service. The service requirement information may include at least one of the following information: a service type, a security level, an isolation level, a throughput (or a rate), coverage, and a quality of service (quality of service, QoS) requirement.

S202. The first management unit sends priority information to the second management unit based on the received service request message in S201, and the second management unit receives the priority information sent by the first management unit.

The priority information is used to indicate a priority of the tenant, or indicate a priority of the service of the tenant, or is used to indicate a priority of the tenant and a priority of the service of the tenant. The priority information is used to assist the second management unit in selecting a network slice for the service of the tenant.

The priority information in this embodiment of this application may be one indicator (indicator). For example, a value of the indicator is represented by 0, 1, 2, . . . , and if a value of the indicator is 0, it indicates that the service has a highest priority, or if a value of the indicator is 1, 2, . . . , it indicates that the priority of the service decreases in sequence.

Specifically, the first management unit may determine the priority information in the following several possible implementations.

In a possible implementation, the communication service provider indicates the priority information to the first management unit, and the first management unit determines the priority information based on the indication of the communication service provider. Optionally, the indication may be represented by a service request message. For example, the communication service provider sends a service request message to the first management unit, and the service request message carries the priority information. The first management unit receives the priority information from the communication service provider, and obtains the priority information from the service request message.

In another possible implementation, the first management unit obtains the service request message, and converts a service requirement in the service request message into a network requirement. In other words, the first management unit determines a network requirement of the service based on the service requirement information. For the service requirement information described in S201, the network requirement of the service may include at least one of the following information: a latency requirement, a bandwidth requirement, and QoS of a network. The first management unit determines the priority information based on the network requirement of the service. In specific implementation, each type of the network requirement has a weight attribute, and the first management unit may perform weighting based on a weight of each type of the network requirement to obtain the priority of the service. For example, if a service has a very high requirement on a latency, a weight value of the network requirement, namely, a service latency, is set to be relatively high.

In still another possible implementation, in addition to the service requirement information, the service request message in S201 may further carry an identifier (ID) of the tenant and/or an identifier (ID) of the service. The first management unit may determine the priority information based on any one or more of the ID of the tenant, the ID of the service, and the service requirement information. In specific implementation, each type of the service requirement information has a weight attribute, and the first management unit may perform weighting based on a weight of each type of the service requirement information to obtain the priority of the service. For example, if a service has a very high requirement on a latency, a weight value of the service requirement information, namely a service latency, is set to be relatively high.

The foregoing several possible manners of determining the priority information may be used in combination, or may be used independently.

That the first management unit sends the priority information to the second management unit may be implemented in the following manner.

The first management unit sends a network slice request message to the second management unit, and the network slice request message carries the priority information. The second management unit receives the network slice request message from the first management unit, and obtains the priority information carried in the network slice request message.

The network slice request is used to request to select the network slice for the service. The network slice request message may further carry one or more of the ID of the tenant, the ID of the service, and information about the network requirement of the service.

S203. The second management unit selects the network slice for the service of the tenant based on the priority information.

That the second management unit selects the network slice for the service means that the second management unit allocates an existing network slice to the service, or creates a new network slice for the service. Specifically, the second management unit determines, based on the priority information of the service, to carry the service in a network slice that matches the priority. For example, the second management unit independently carries a high-priority service in one network slice, and carries a low-priority service in a shared network slice. Sharing means that the service and another service are jointly carried in the network slice. In this way, performance of the high-priority service can be preferentially ensured. The second management unit may prestore a mapping relationship between a priority and a network slice, and allocate, to a service based on the mapping relationship, a network slice corresponding to the priority of the service.

After S203, S204 and S205 are performed, or S204' and S205' are performed.

S204. The second management unit sends a network slice subnet request message to the third management unit, and the third management unit receives the network slice subnet request message sent by the second management unit.

A network slice subnet request carries priority information, and the priority information is the priority information received by the second management unit from the first management unit. The network slice subnet request may further carry one or more of the identifier of the tenant, the identifier of the service, or a subnet requirement of a tenant service.

The network slice subnet request is used to request to select a network slice subnet for the service. In actual application, a network slice may cross a domain. For example, the network slice crosses a plurality of domains such as an access network, a core network, and a transport network. One sub-slice is allocated to each domain, and all sub-slices are combined into a network slice.

For a type of the subnet requirement of the tenant service, reference to the foregoing description of the network requirement may be made. To be specific, the type of the subnet requirement of the tenant service may include at least one of the following information: a latency requirement, a bandwidth requirement, or QoS of a subnet. A network requirement is decomposed into network slice subnets cross the plurality of domains to form a plurality of subnet requirements. For example, a latency requirement is 10 ms, and a network slice that crosses three domains: an access network, a core network, and a transport network includes three network slice subnets. In this case, the subnet requirements of the three network slice subnets may be 3 ms, 3 ms, and 4 ms respectively.

S205. After receiving the network slice subnet request message sent by the second management unit, the third management unit selects a network slice subnet for the service of the tenant based on priority information in the network slice subnet request message.

Similarly, when selecting the network slice subnet for the service, the third management unit carries, based on the priority of the service, the service in the network slice subnet that matches the priority. For example, the third management unit independently carries a high-priority service in one network slice subnet, and carries a low-priority service in a shared network slice subnet. In this way, performance of the high-priority service can be preferentially ensured. The third management unit may prestore a mapping relationship between a priority and a network slice subnet, and allocate, to a service based on the mapping relationship, a network slice subnet corresponding to the priority of the service.

S204'. The second management unit sends an NF configuration message to the fourth management unit, and the fourth management unit receives the NF configuration message sent by the second management unit.

The NF configuration message carries the priority information, and the priority information is received by the second management unit from the first management unit. The NF configuration message may further carry one or more of the identifier of the tenant, the identifier of the service, or an NF network requirement of a tenant service.

The NF configuration message is used to select an NF for the service of the tenant.

For a type of the NF network requirement of the tenant service, refer to the foregoing descriptions of the network requirement. To be specific, the NF network requirement of the tenant service may include at least one of the following information: a latency requirement, a bandwidth requirement, or QoS of an NF network. A relationship between a network slice subnet and an NF is similar to that between a network slice and a network slice subnet. The network slice subnet may also include a plurality of NFs, and a subnet requirement is decomposed into a plurality of NF network requirements.

S205'. After receiving the NF configuration message sent by the second management unit, the fourth management unit processes the service of the tenant based on the priority information in the NF configuration message.

Specifically, the fourth management unit preferentially processes a high-priority service. For example, when two or more services need to access the NF and the NF cannot process the services at the same time, the NF preferentially accesses a relatively high-priority service.

According to the network slice selection method, in a scenario in which a plurality of tenants share one network slice, an adaptive network slice may be allocated to the relatively high-priority service based on the priority of the tenant or the priority of the service, to preferentially ensure performance of a high-priority service. This ensures that allocation of resources of a plurality of tenants in one network slice is proper and effective.

Based on the foregoing descriptions of the network slice selection method, the system architecture, and the like, to make the solutions of this application more detailed, the following further describes the network slice selection method in this application in detail with reference to a specific application scenario.

Figure 3:
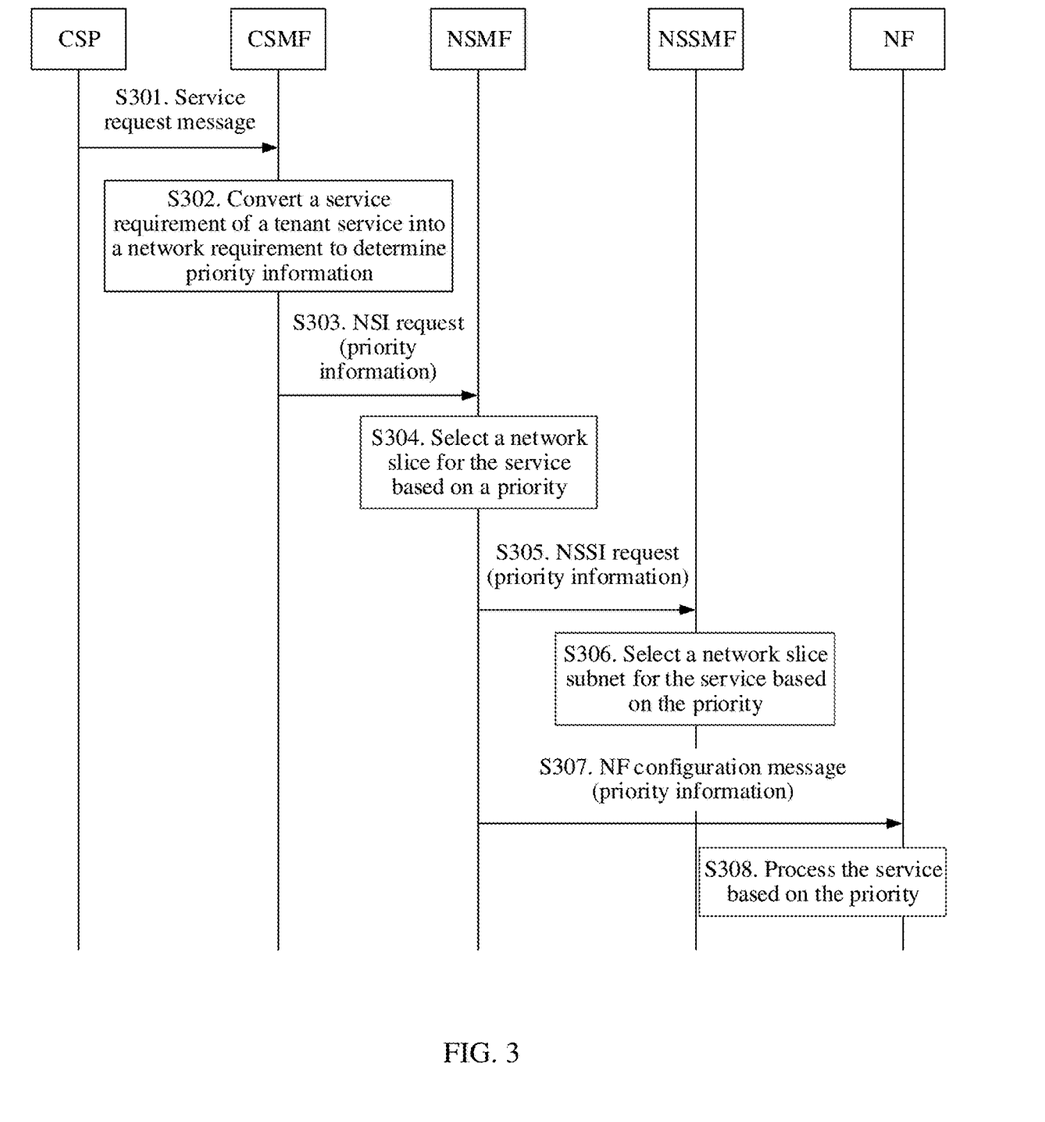
FIG. 3 is a second schematic flowchart of a network slice selection method according to an embodiment of this application.

In the following descriptions of the application scenario, the communication service provider is a CSP, the first management unit is a CSMF, the second management unit is an NSMF, the third management unit is an NSSMF, and the fourth management unit is an NF.

As shown in FIG. 3, a procedure of a network slice selection method in an application scenario is described as follows:

S301. A CSP sends a service request message to a CSMF.

The service request message carries service requirement information of a service. The service requirement information may include at least one of the following information: a service type, a security level, an isolation level, a throughput (or a rate), coverage, and a quality of service (quality of service, QoS) requirement.

In a possible design, the service request message may carry priority information of the service.

S302. The CSMF converts the service requirement information of a tenant service into a network requirement.

The network requirement of the service may include at least one of the following information: a latency requirement, a bandwidth requirement, and QoS of a network. The CSMF may determine the priority information based on the network requirement of the service.

S303. The CSMF sends a network slice request message (NSI request message) to an NSMF, and the NSMF receives the network slice request message sent by the CSMF.

The network slice request message may carry the network requirement of the tenant service, or may carry the priority information of the service, or may carry both of the network requirement of the tenant service and the priority information of the service.

S304. The NSMF allocates a network slice to the service or creates a new network slice.

Specifically, the NSMF allocates or creates a network slice for the service based on the network requirement of the tenant service, to ensure performance of the service. Alternatively, the NSMF allocates, to the service based on the priority information of the service, a network slice that matches the priority.

For example, the NSMF receives NSI requests of a tenant service 1 and a tenant service 2. Network latency requirements of both the tenant service 1 and the tenant service 2 are 1 ms, a latency of an NSI 1 is 0.5 ms, and a latency of an NSI 2 is 1 ms. Because a subnet of the tenant service 1 has a high priority, the NSMF carries the tenant service 1 in the NSI 1, and carries the tenant service 2 in the NSI 2.

After S304, S305 and S306, or S307 and S308 may be performed, or S305 to S308 may be performed. There is no a strict execution sequence between S305 and S306, and S307 and S308.

S305. The NSMF sends an NSSI request to an NSSMF, and the NSSMF receives the NSSI request sent by the NSMF.

The NSSI request carries an identifier of a tenant, an identifier of a service, priority information, or a subnet requirement of a tenant.

S306. The NSSMF allocates an NSSI to the service.

The NSSMF allocates, to the service based on the priority information, a network slice subnet that matches the priority; or the NSSMF allocates or creates a network slice subnet for the service based on the subnet requirement of the tenant, to ensure performance of the service.

For example, the NSSMF receives NSSI requests of a tenant service 1 and a tenant service 2. Subnet latency requirements of both the tenant service 1 and the tenant service 2 are 1 ms, a latency of an NSSI 1 is 0.5 ms, and a latency of an NSSI 2 is 1 ms. Because a subnet of the tenant service 1 has a high priority, the NSSMF carries the tenant service 1 in the NSSI 1, and carries the tenant service 2 in the NSSI 2.

S307. The NSMF sends an NF configuration message to an NF, and the NF receives the NF configuration message sent by the NSMF.

The NF configuration message may carry an NF network requirement, the identifier of the tenant, the identifier of the service, or the priority information.

S308. The NF selects an NF that needs to be accessed for the service.

The NF selects an NF that is to be accessed for the service based on the priority information, or the NF selects an NF that is to be accessed for the service based on the NF network requirement. In this way, performance of a high-priority service is preferentially ensured.

For example, the NF receives NF configuration messages of both a tenant service 1 and a tenant service 2, but the NF cannot process the NF configuration messages at the same time. Because the tenant service 1 has a high priority, the NF preferentially accesses a user of the tenant service 1.

In this embodiment of this application, the second management unit (or the NSMF) may alternatively create and maintain priority information of a network slice instance NSI.

Specifically, when creating a new network slice instance, the second management unit configures the priority information for the NSI. For example, the priority information is configured based on slice performance information of the network slice instance. The slice performance information may be related information of a latency requirement, a bandwidth requirement, and a quality of service requirement of a network that correspond to the network slice instance.

The second management unit may alternatively dynamically update, that is, maintain, priority information of a network slice instance that has been created. The second management unit dynamically obtains slice performance information of the network slice instance that has been created, and the slice performance information is obtained by combining subnet slice performance information obtained from the third management unit (NSSMF). A combination method is not limited. Similarly, the slice performance information may be related information of a latency requirement, a bandwidth requirement, and a quality of service requirement of a network that correspond to the network slice instance. The second management unit dynamically updates, based on the slice performance information, the priority information of the network slice instance that has been created.

Similarly, there may be a plurality of types of the slice performance information, and the second management unit may perform weighting based on a weight of each type of the slice performance information to obtain the priority information of the network slice instance.

When selecting a proper network slice for the service, the second management unit may select a matched network slice instance for the service based on the priority information of the service and the priority information of the network slice instance.

Figure 4:
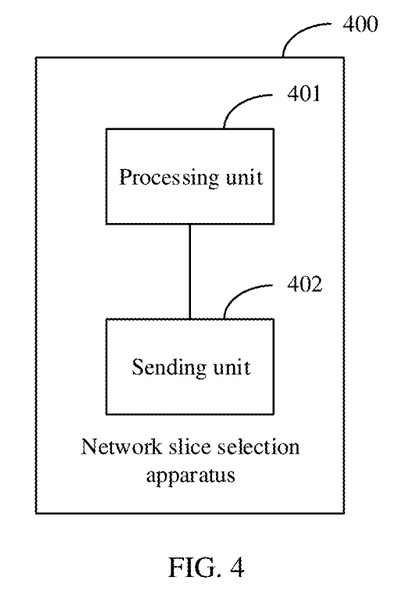
FIG. 4 is a first schematic structural diagram of a network slice selection apparatus according to an embodiment of this application.

An embodiment of this application further provides a network slice selection apparatus 400 based on a same inventive concept as that of the foregoing method, as shown in FIG. 4. The network slice selection apparatus 400 is configured to perform an operation performed by the first management unit in the foregoing method embodiment. The network slice selection apparatus 400 includes a processing unit 401 and a sending unit 402.

The processing unit 401 is configured to obtain a service request message, where the service request message is used to initiate a service request for a service of a tenant; and the sending unit 402 is configured to send a network slice request message to a second management unit based on the service request message, where the network slice request message carries priority information, the priority information is used to indicate a priority of the tenant or a priority of the service, and the priority information is used by the second management unit to select a network slice for the service of the tenant.

The processing unit 401 is further configured to determine the priority information based on the service request message.

A determining method may include the following several methods.

For example, the processing unit 401 is configured to determine the priority information based on at least one piece of information in the service request message. The service request message includes at least one of the following information: identification information of the tenant, identification information of the service, and service requirement information of the service, and the service requirement information includes at least one of the following information: a service type, a security level, an isolation level, a throughput, coverage, and a quality of service requirement.

For another example, the sending unit 402 determines the priority information based on the service request message, and is configured to determine a network requirement of the service based on the service requirement information of the service, and determines the priority information based on the network requirement of the service, where the service requirement information includes at least one of the following information: a service type, a security level, an isolation level, a throughput, coverage, and a quality of service requirement, and network requirement information includes at least one of the following information: a latency requirement, a bandwidth requirement, and a network quality of service requirement.

If the sending unit 402 receives the service request message from a communication service provider, the service request message may carry the priority information, and the sending unit 402 obtains the priority information from the service request message.

Figure 5:
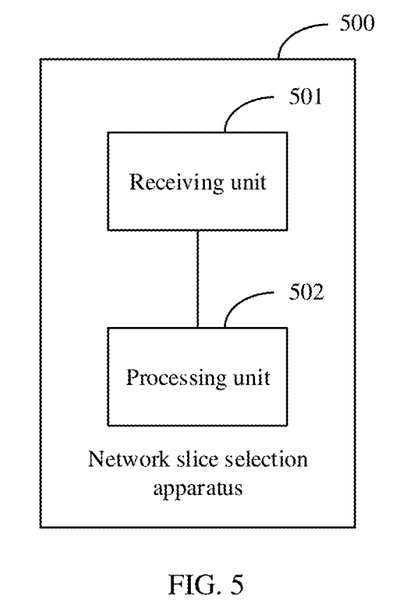
FIG. 5 is a second schematic structural diagram of a network slice selection apparatus according to an embodiment of this application.

An embodiment of this application further provides a network slice selection apparatus 500 based on a same inventive concept as that of the foregoing method, as shown in FIG. 5. The network slice selection apparatus 500 is configured to perform an operation performed by the second management unit in the foregoing method embodiment. The network slice selection apparatus 500 includes a receiving unit 501 and a processing unit 502.

The receiving unit 501 is configured to receive a network slice request message from a first management unit, where the network slice request message carries first priority information, and the first priority information is used to indicate a priority of a tenant or a priority of a service of a tenant; and a processing unit 502 is configured to select a network slice for the service of the tenant based on the first priority information.

In a possible design, when selecting the network slice for the service of the tenant based on the first priority information, the processing unit 502 is configured to: determine second priority information that matches the first priority information, where the second priority information is used to indicate a priority of the network slice; and select the network slice having the second priority information for the service of the tenant.

The processing unit 502 is further configured to create the network slice, and configure the second priority information for the network slice based on first slice performance information of the network slice; or if the network slice is a network slice that has been created, the processing unit 502 is further configured to: obtain second slice performance information of the network slice, and dynamically update priority information of the network slice based on the second slice performance information, where the updated priority information is the second priority information.

Optionally, both the first slice performance information and the second slice performance information include at least one of the following information: a latency requirement, a bandwidth requirement, and a network quality of service requirement.

Figure 6:
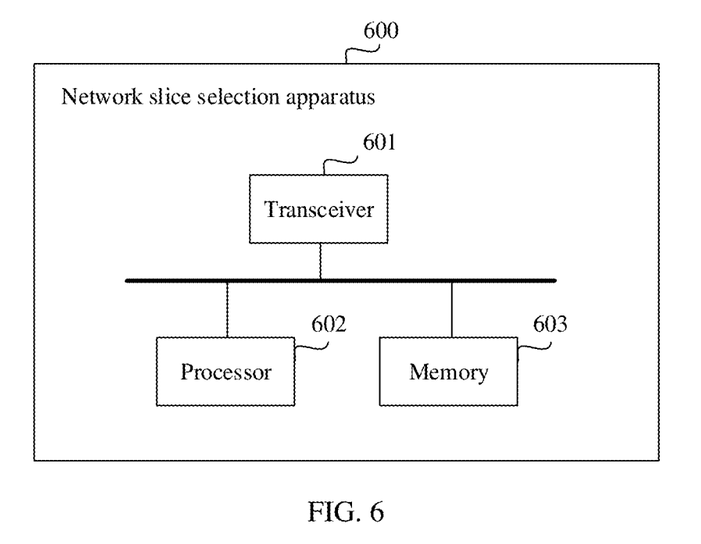
FIG. 6 is a third schematic structural diagram of a network slice selection apparatus according to an embodiment of this application.

An embodiment of this application further provides a network slice selection apparatus 600 based on a same inventive concept as that of the foregoing method embodiment, as shown in FIG. 6. The network slice selection apparatus 600 includes a transceiver 601, a processor 602, and a memory 603. The memory 603 is optional. The memory 63 is configured to store a program executed by the processor 602. When the network slice selection apparatus 600 is configured to implement the operation performed by the first management unit in the foregoing method embodiment, the processor 602 is configured to invoke a group of programs. When the programs are executed, the processor 602 is enabled to implement the operation performed by the first management unit in the foregoing method embodiment. The functional module, namely, the sending unit 402 in FIG. 4 may be implemented by using the transceiver 601, and the processing unit 401 may be implemented by using the processor 602. When the network slice selection apparatus 600 is configured to implement the operation performed by the second management unit in the foregoing method embodiment, the processor 602 is configured to invoke a group of programs. When the programs are executed, the processor 602 is enabled to implement the operation performed by the second management unit in the foregoing method embodiment. The functional module, the receiving unit 501 in FIG. 5 may be implemented by using the transceiver 601, and the processing unit 502 may be implemented by using the processor 602.

The processor 602 may be a central processing unit (central processing unit, CPU), a network processor (network processor, NP), or a combination of the CPU and the NP.

The processor 602 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 603 may include a volatile memory (volatile memory), for example, a random access memory (random-access memory, RAM); or the memory 603 may include a non-volatile memory (non-volatile memory), for example, a flash memory (flash memory), a hard disk (hard disk drive, HDD), or a solid-state drive (solid-state drive, SSD); or the memory 603 may include a combination of the foregoing types of memories.

In the communication methods provided in the foregoing embodiments of this application, some or all of the described operations and functions performed by the terminal and the network device may be implemented by using a chip or an integrated circuit.

To implement functions of the apparatuses in FIG. 4, FIG. 5, and FIG. 6, an embodiment of this application further provides a chip, including a processor, configured to support the apparatuses in implementing functions of the first management unit and the second management unit in the foregoing method embodiments. In a possible design, the chip is connected to a memory or the chip includes a memory, and the memory is configured to store program instructions and data that are necessary for the apparatus.

An embodiment of this application provides a computer storage medium. The computer storage medium stores a computer program, and the computer program includes instructions used to perform the method embodiments provided in the foregoing embodiments.

An embodiment of this application further provides a computer program product including instructions. When the computer program product runs on a computer, the computer is enabled to perform the method embodiments provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may alternatively be loaded on the computer or another programmable data processing device, so that a series of operation steps are performed on the computer or the another programmable device to produce processing implemented by the computer. Therefore, the instructions executed on the computer or the another programmable device provide steps for implementing a specific function in the one or more processes in the flowcharts and/or in the one or more blocks in the block diagrams.

Although some preferred embodiments of this application have been described, a person skilled in the art can make changes and modifications to these embodiments once learning the basic inventive concept. Therefore, the following claims are intended to be construed as to cover the preferred embodiments and all changes and modifications falling within the scope of this application.

It is clear that a person skilled in the art can make various modifications and variations to the embodiments of this application without departing from the spirit and scope of the embodiments of this application. In this case, this application is intended to cover these modifications and variations in the embodiments of this application provided that they fall within the scope of the following claims and their equivalent technologies.

What is claimed is:

1. A network slice selection method, comprising:
obtaining, by a first network slice selection apparatus, a service request message, wherein the service request message is to initiate a service request for a service of a tenant, and the service request message includes service requirement information of the service;
determining, by the first network slice selection apparatus, a network requirement of the service based on the service requirement information of the service included in the service request message;
determining, by the first network slice selection apparatus, priority information based on the network requirement of the service; and
sending, by the first network slice selection apparatus, a network slice request message to a second network slice selection apparatus based on the service request message, wherein
the network slice request message carries the priority information and information about the network requirement of the service, and
the priority information indicates at least one of a priority of the tenant or a priority of the service,
the priority information and the information about the network requirement of the service are usable by the second network slice selection apparatus to select a network slice for the service of the tenant, to cause the service to be provided over the selected network slice to the tenant, wherein selecting the network slice for the service of the tenant comprises:
in response to the priority information indicating the service having a higher priority, carrying the service having the higher priority independently in one network slice, and
in response to the priority information indicating the service having a lower priority, carrying the service having the lower priority in a shared network slice in which the service having the lower priority is jointly carried with another service, and
the priority information is usable by a further apparatus, to which the second network slice selection apparatus sends a network function configuration message including the priority information, to select a network function to be accessed for the service of the tenant.

2. The method according to claim 1, wherein
the service requirement information comprises at least one of: a service type, a security level, an isolation level, a throughput, coverage, or a quality of service requirement.

3. The method according to claim 1, wherein the network requirement comprises at least one of: a latency requirement, a bandwidth requirement, or a network quality of service requirement.

4. The method according to claim 1, wherein
the network requirement comprises more than one types, each type being a different one of: a latency requirement, a bandwidth requirement, or a network quality of service requirement, and
said determining the priority information based on the network requirement of the service comprises performing, by the first network slice selection apparatus, weighting based on a weight of each type of the network requirement to obtain the priority of the service.

5. A network slice selection method, comprising:
receiving, by a second network slice selection apparatus, a network slice request message from a first network slice selection apparatus, wherein
the network slice request message carries first priority information and information about a network requirement of a service of a tenant,
the first priority information indicates at least one of a priority of the tenant or a priority of the service of the tenant, and
the first priority information is determined based on the network requirement of the service; and
selecting, by the second network slice selection apparatus, a network slice for the service of the tenant based on the first priority information and the information about the network requirement of the service, to cause the service to be provided over the selected network slice to the tenant, wherein
said selecting the network slice for the service of the tenant comprises:
in response to the first priority information indicating the service having a higher priority, carrying the service having the higher priority independently in one network slice, and
in response to the first priority information indicating the service having a lower priority, carrying the service having the lower priority in a shared network slice in which the service having the lower priority is jointly carried with another service, and
the method further comprises sending, by the second network slice selection apparatus, a network function configuration message including the first priority information to a first apparatus to cause the first apparatus to select a network function to be accessed for the service of the tenant.

6. The method according to claim 5, wherein the selecting, by the second network slice selection apparatus, the network slice for the service of the tenant based on the first priority information comprises:
determining, by the second network slice selection apparatus, second priority information that matches the first priority information, wherein the second priority information indicates a priority of the network slice; and
selecting, by the second network slice selection apparatus, the network slice having the second priority information for the service of the tenant.

7. The method according to claim 6, wherein the method further comprises:
creating, by the second network slice selection apparatus, the network slice, and configuring the second priority information for the network slice based on first slice performance information of the network slice; or
when the network slice has been created, obtaining, by the second network slice selection apparatus, second slice performance information of the network slice, and dynamically updating priority information of the network slice based on the second slice performance information, wherein the updated priority information is the second priority information.

8. The method according to claim 7, wherein each of the first slice performance information and the second slice performance information comprises at least one of: a latency requirement, a bandwidth requirement, or a network quality of service requirement.

9. The method according to claim 6, further comprising:
prestoring, by the second network slice selection apparatus, a mapping relationship between the priority and the network slice,
wherein said determining the second priority information that matches the first priority information is based on the prestored mapping relationship.

10. The method according to claim 5, wherein
the network requirement of the service comprises at least one of a latency requirement, a bandwidth requirement, or a network quality of service requirement.

11. The method according to claim 5, wherein the method further comprises:
sending, by the second network slice selection apparatus, a network slice subnet request message to a second apparatus to request the second apparatus to select a network slice subnet for the service.

12. The method according to claim 11, wherein
the network slice subnet request message comprises:
the priority information received by the second network slice selection apparatus from the first network slice selection apparatus, and
a subnet requirement of the service, wherein the subnet requirement comprises at least one of a latency requirement, a bandwidth requirement, or a subnet quality of service requirement,
the network slice crosses a plurality of domains, and
the network requirement is decomposed into network slice subnets cross the plurality of domains to form a plurality of subnet requirements.

13. The method according to claim 11, wherein
selecting the network slice subnet for the service comprises:
in response to the priority information indicating the service having the higher priority, carrying the service having the higher priority independently in one network slice subnet, and
in response to the priority information indicating the service having the lower priority, carrying the service having the lower priority in a shared network slice subnet in which the service having the lower priority is jointly carried with a further service.

14. The method according to claim 13, wherein the service having the higher priority is carried independently in the one network slice subnet without a further service being carried in the one network slice subnet.

15. The method according to claim 5, wherein the network function configuration message further comprises a network function network requirement to be used by the first apparatus to select the network function to be accessed for the service of the tenant.

16. A network slice selection apparatus, comprising:
at least one processor; and
a non-transitory computer-readable storage medium coupled to the at least one processor and storing programming instructions for execution by the at least one processor to cause the network slice selection apparatus:
obtain a service request message, wherein
the service request message is to initiate a service request for a service of a tenant, and
the service request message includes service requirement information of the service,
determine a network requirement of the service based on the service requirement information of the service included in the service request message,
determine priority information based on the network requirement of the service, and
send a network slice request message to a further network slice selection apparatus based on the service request message, wherein
the network slice request message carries the priority information and information about the network requirement of the service, and
the priority information indicates at least one of a priority of the tenant or a priority of the service,
the priority information and the information about the network requirement of the service are usable by the further network slice selection apparatus to select a network slice for the service of the tenant, to cause the service to be provided over the selected network slice to the tenant, wherein the further network slice selection apparatus is configured to select the network slice for the service of the tenant by:
in response to the priority information indicating the service having a higher priority, carrying the service having the higher priority independently in one network slice, and
in response to the priority information indicating the service having a lower priority, carrying the service having the lower priority in a shared network slice in which the service having the lower priority is jointly carried with another service, and
the further network slice selection apparatus is further configured to send a network function configuration message including the priority information to a further apparatus to cause the further apparatus to select, based on the priority information, a network function to be accessed for the service of the tenant.

17. The network slice selection apparatus according to claim 16, wherein
the network requirement comprises at least one of: a latency requirement, a bandwidth requirement, or a network quality of service requirement.

* * * * *